Dec. 9, 1924.
J. C. PEWTHER
ANTIRATTLER
Filed July 8, 1924
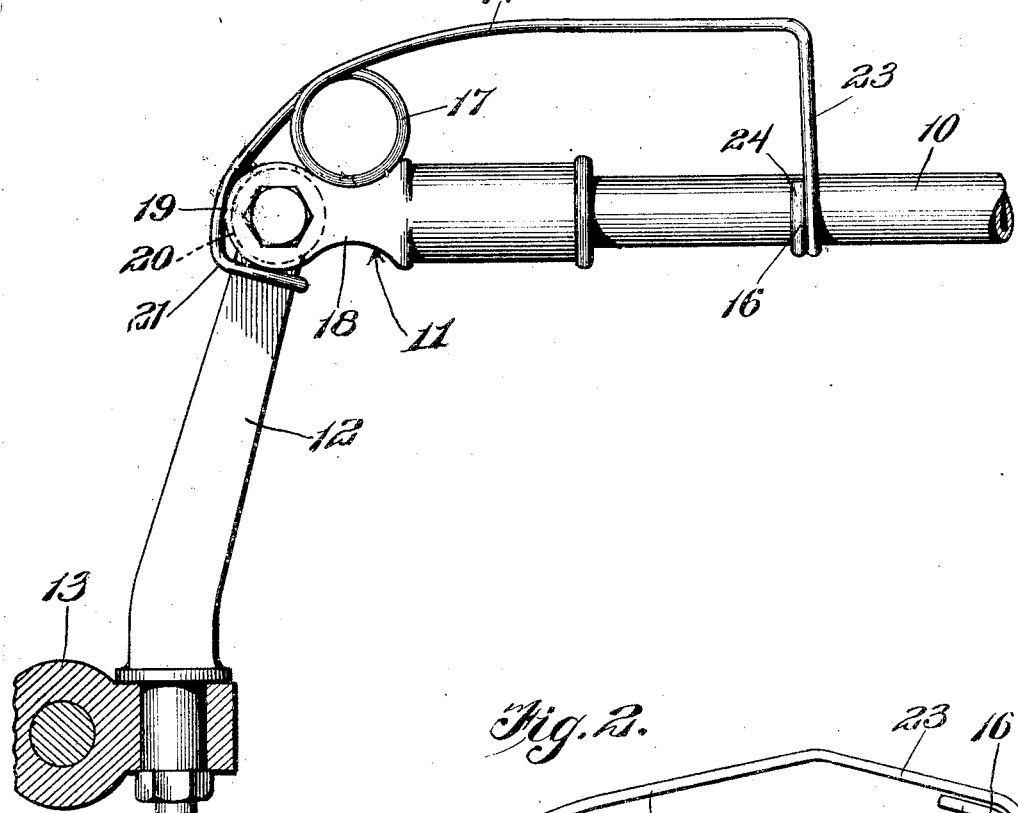
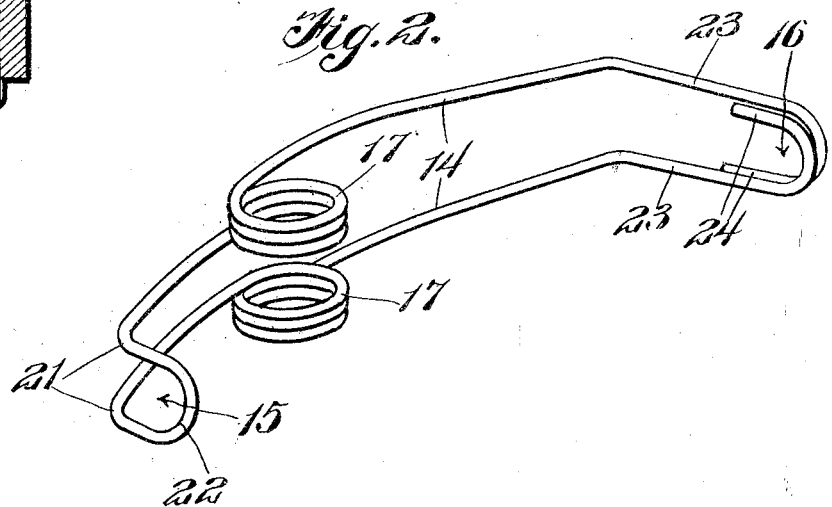
Inventor
Judson C. Pewther
Watson E. Coleman
Atty Patented Dec. 9, 1924.

1,519,046

UNITED STATES PATENT OFFICE.

JUDSON C. PEWTHER, OF WICHITA, KANSAS.

ANTIRATTLER.

Application filed July 8, 1924. Serial No. 724,915.

*To all whom it may concern:*

Be it known that I, JUDSON C. PEWTHER, a citizen of the United States, residing at Wichita, in the county of Sedgwick and State of Kansas, have invented certain new and useful Improvements in Antirattlers, of which the following is a specification, reference being had to the accompanying drawings.

This invention relates to a combined antirattler and steering gear stabilizer for vehicles.

An important object of the invention is to provide a device of this character which will remove from the steering gear the vibratory motion often occurring in light cars and generally referred to as "shimmying."

A further and more specific object of the invention is to provide a device of this character checking this vibratory motion after the principle of checking the vibration of a tuning fork or similar vibrating article by stroking the same with a feather, that is to say, the application of pressure of the sliding motion longitudinally of the vibrating member.

A still further object of the invention is to provide a device of this character which may be readily applied to the steering gear of the vehicle without in any manner altering the construction thereof or disassembly of any of the points of connection of such steering mechanism.

These and other objects I attain by the construction shown in the accompanying drawings, wherein for the purpose of illustration is shown a preferred embodiment of my invention and wherein:—

Figure 1 is a plan view showing an antirattler constructed in accordance with my invention applied to the steering arm and steering arm connecting rod of the vehicle;

Figure 2 is a perspective view of the same when removed.

Referring now more particularly to the drawings, the numeral 10 indicates the tie rod of a steering mechanism having at its ends bifurcated fittings 11, only one of which is shown, these bifurcated fittings receiving the rear ends of the steering arms 12 of a steering spindle 13. In the usual construction of a vehicle, these steering arms, when the wheels are in a position for straight ahead travel, extend approximately directly rearwardly to engage with the ends of the tie rod 10. When in travel of the vehicle, particularly when the vehicle is of light construction, the wheels are subjected to a succession of light blows tending to cause them to deviate from the straight path often start vibrating, particularly if there is any looseness in the steering mechanism. This vibration if once started is extremely difficult to stop or to control, becoming by its continuation extremely tiring upon the arms of the driver of the vehicle. In accordance with my invention, I provide a tensioning member comprising a body 14 having at one end a hook 15 engaging the steering arm 12 of the steering spindle 13 and at its opposite end a hook 16 engaging the tie rod 10 and intermediate its ends a coil 17 bearing upon and sliding against the bifurcated fitting 11 at the end of the tie rod.

The bifurcated fitting 11 has the arms 18 thereof rounding and fairly smooth, so that this sliding action is not interfered with and the coil 17 is arranged more nearly adjacent the hook 15 than the hook 16. The tensioning member is so constructed that no tension would be applied when the arm 12 and rod 10 were approximately aligned, with the result that when in applied position this arm is placed always under a tension urging it toward alignment with the rod 10, with the result that it is held firmly against the pivot bolt 19 extending through the arms 18 and the arm 12 to connect the same and any rattling at this point is prevented. Furthermore, it will be obvious that movement of the steering tire rod 10 to one side or the other of its central position will cause one of the arms 12 to increase its angularity to the tie rod and the other of the arms to decrease such angularity, with the result that the tension of the two sets of coils which are provided on the vehicle will be unbalanced and there is a tendency of the tie rod at all times to return to the central position where this tension is balanced, thus normally maintaining the vehicle with the wheels thereof in straightway steering position. During movement of the arm with relation to the rod in which change of angularity is effected, there is a movement of the coil 17 upon the arms 18 due to the fact that the length of the body portion lying between the hook 15 and the loop is just sufficient to enable the hook 15 to be engaged about the arm forwardly of the enlargement 20 of the arm which engages in the bifurcated fitting 11. This being the case, that portion of the body lying between the coil and hook 15 come into engagement with this enlargement and operates as a lever tending to shift the coil longitudinally of the member 10. This movement likewise tends to tension the coil with the result that the tension of the hook 16 with the bar 10 is increased and at the same time this hook is slid longitudinally of the bar, rubbing against the bar to destroy the vibratory movement as above described.

In the construction of the tensioning element 14, I preferably employ a single length of wire which is bent intermediate its ends so that the ends of the wire lie in spaced parallel relation to one another. These arms adjacent the point of reversion, indicated at 21, are bent, as at 22, to form the hook 15, in reality in the form of a double hook the points of which are merged at a point spaced a short distance from the bend 22. The arms are then each coiled to provide the coil 17. The terminal portions of the arms are bent to the same side of the arms as the hook 15, as indicated at 23, and have their terminal portions in turn bent to provide separate hooks 24 facing in opposite directions. These hooks overlap one another so that in effect they provide a closed hook similar to the hook 15. In applying the device, the arms are engaged with the hand and spread to separate the hooks 24 and sections of the coil 17 and while thus separated are slid over the steering arm 12, so that the bight 21 forming a part of the hook 15 is engaged against the inner face of the arm. The ends of the arms are then forced rearwardly and inwardly so that the coils are brought against the surface of the bifurcated element 11 and the hooks 24 are engaged with the rod 10 from opposite sides thereof.

It will, of course, be obvious that this specific construction is capable of a certain range of change and modification and other means of providing a readily applicable tensioning element of the general construction above described might be provided. I accordingly do not limit myself to such specific structure as hereinbefore set forth except as hereinafter claimed.

I claim:—

1. In combination with the tie rod of automobile steering mechanism and with the steering spindle arm pivotally engaged with the end of the tie rod, a member hooked about and slidable upon the tie rod at a point spaced from the end thereof at one end and having its opposite end hooked about the steering spindle arm at a point spaced from the pivotal connection and intermediate its ends with a coil slidably abutting said pivotal connection.

2. In combination with the tie rod of automobile steering mechanism and with the steering spindle arm pivotally engaged with the end of the tie rod, a member hooked about and slidable upon the tie rod at a point spaced from the end thereof at one end and having its opposite end hooked about the steering spindle arm at a point spaced from the pivotal connection and intermediate its ends with a coil slidably abutting said pivotal connection, the portion of said member lying between the coil and the end hooked about the steering spindle arm being relatively short and abutting the end of the spindle arm to thereby form a lever causing shifting of the coil about the pivotal connection as the angular relation of the arm and tie rod is altered.

3. The combination with two members disposed at an angle and pivotally connected at their adjacent ends, of a resilient body disposed upon the exterior of the angle between the members and having connection with one of said members whereby it is rendered rigid to the member, the opposite end of the body being slidably engaged with the other of the members and by its engagement tending to move said other member into alignment with the first named member.

4. The combination with two members disposed at an angle and pivotally connected at their adjacent ends, of a resilient body disposed upon the exterior of the angle between the members and having connection with one of said members whereby it is rendered rigid to the member, the opposite end of the body being slidably engaged with the other of the members and by its engagement tending to move said other member into alignment with the first named member, said body intermediate its ends being formed with a coil abutting the pivotal connection between the members, the connections between the ends of the body and the coil occurring at the outer side of the coil with relation to the pivotal connection between the members.

In testimony whereof I hereunto affix my signature.

JUDSON C. PEWTHER.